(12) United States Patent
Gallas

(10) Patent No.: US 11,493,785 B2
(45) Date of Patent: Nov. 8, 2022

(54) PHOTOTHERAPEUTIC NEAR IR FLUORESCENT LIGHT FILTERS

(71) Applicant: Photoprotective Technologies Incorporated, San Antonio, TX (US)

(72) Inventor: James M. Gallas, San Antonio, TX (US)

(*) Notice: Subject to any disclaimer, the term of this patent is extended or adjusted under 35 U.S.C. 154(b) by 0 days.

(21) Appl. No.: 15/638,361

(22) Filed: Jun. 29, 2017

(65) Prior Publication Data

US 2017/0299897 A1    Oct. 19, 2017

Related U.S. Application Data

(62) Division of application No. 14/331,147, filed on Jul. 14, 2014, now Pat. No. 9,726,910.

(60) Provisional application No. 61/957,818, filed on Jul. 12, 2013, provisional application No. 61/957,826, filed on Jul. 12, 2013.

(51) Int. Cl.
  *G02C 7/10* (2006.01)
  *G02B 5/20* (2006.01)
  *G02B 5/22* (2006.01)

(52) U.S. Cl.
  CPC ............. *G02C 7/104* (2013.01); *G02B 5/208* (2013.01); *G02B 5/223* (2013.01); *G02C 7/108* (2013.01)

(58) Field of Classification Search
  CPC ........ G02B 5/208; G02B 5/223; G02C 7/104; G02C 7/108; A61K 2800/434; A61K 2800/81; A61Q 17/04; A61Q 19/004
  See application file for complete search history.

(56) References Cited

U.S. PATENT DOCUMENTS

| | | | | |
|---|---|---|---|---|
| 2006/0063738 | A1* | 3/2006 | Bathurst | A61K 31/685 514/78 |
| 2011/0264209 | A1* | 10/2011 | Wiechmann | A61F 2/14 623/6.6 |
| 2013/0309184 | A1* | 11/2013 | Rudolph | C07D 319/06 424/59 |

FOREIGN PATENT DOCUMENTS

| | | | | |
|---|---|---|---|---|
| DE | WO 2012/107158 | * | 8/2012 | ........... C07D 319/06 |
| WO | WO 2009/006443 | * | 1/2009 | ............. A61K 38/16 |

* cited by examiner

*Primary Examiner* — Anna R Falkowitz

(57) ABSTRACT

Ophthalmic lenses and light filters containing special additives that have fluorescence emission in the near infrared region of wavelengths—in order to enhance phototherapy for the human eye when it is exposed to sunlight and artificial lighting.

6 Claims, 5 Drawing Sheets

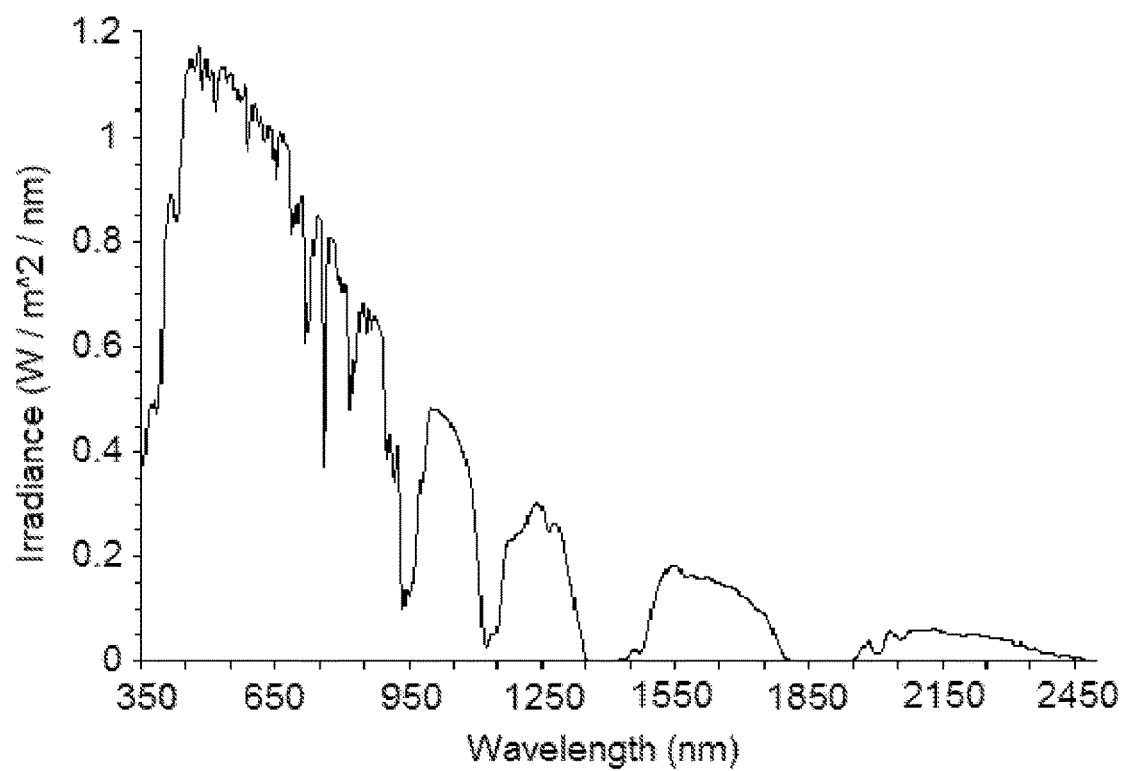
Figure 1. The solar intensity as a function of wavelength.

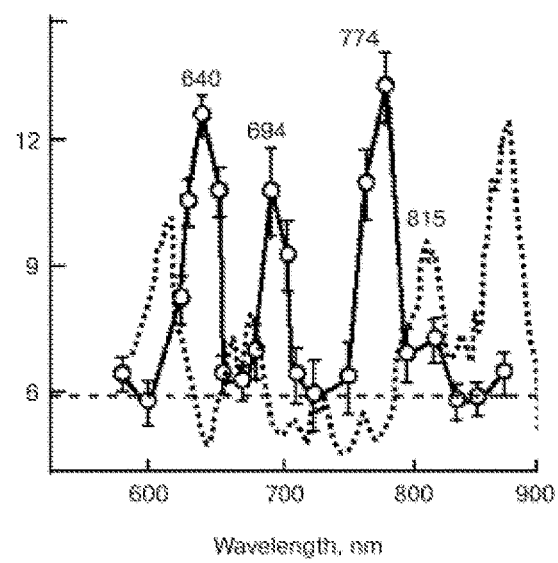
Figure 2. Proposed action spectra for cytochrome-C. Absorption spans the red to near IR range of wavelengths.

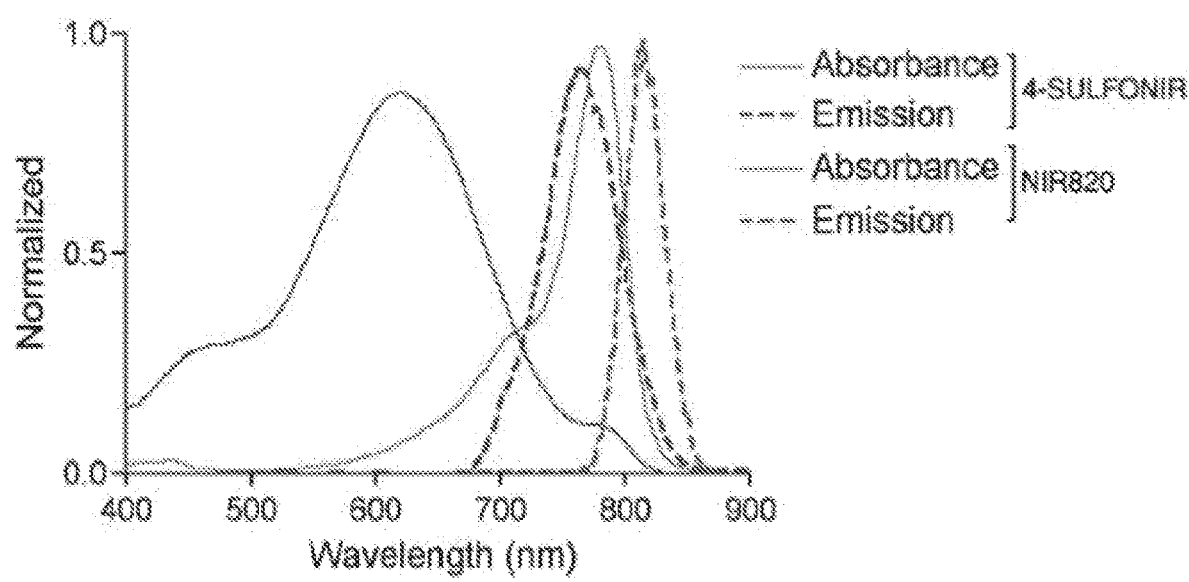
Figure 3. Absorption and Emission spectra of a commercially available fluorophore.

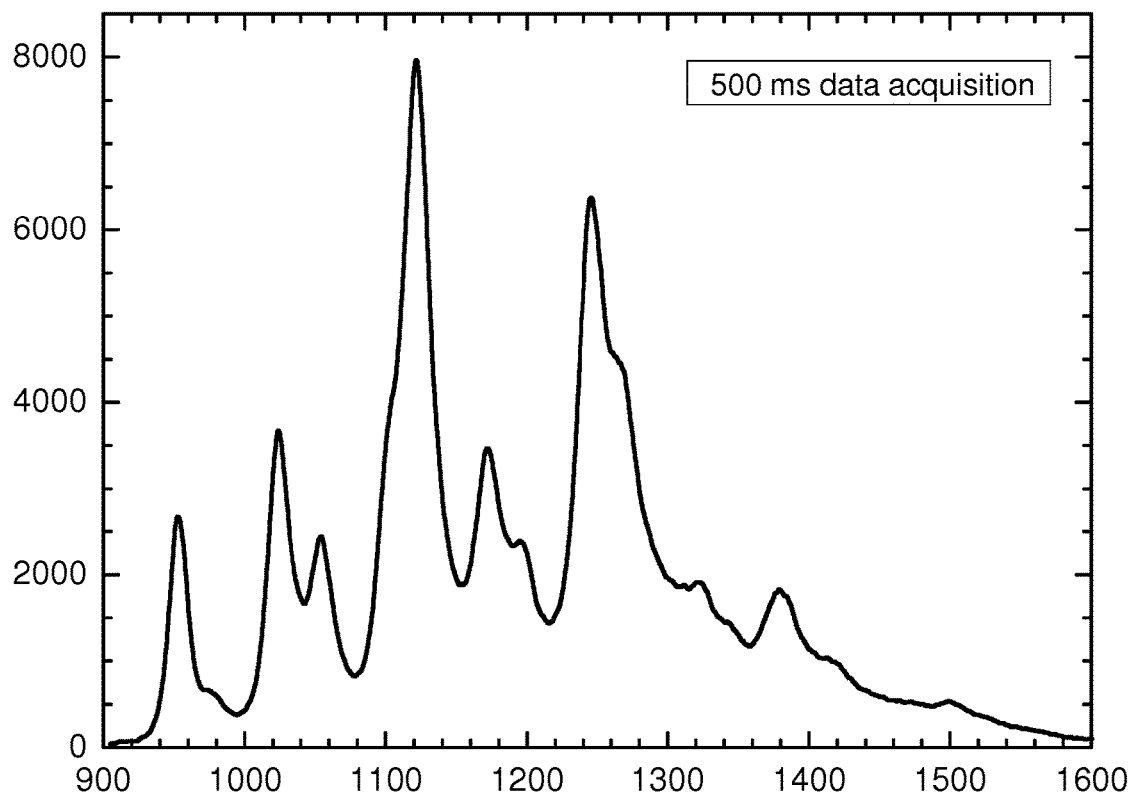
Figure 4. Emission spectrum measured from a suspension of single-walled carbon.

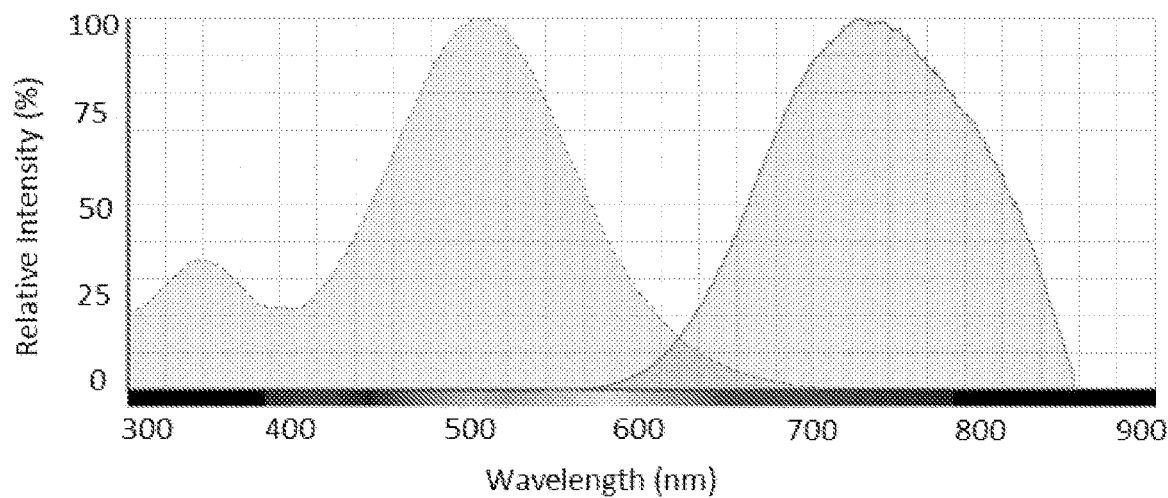
Figure 5. Absorption and Emission spectra of a commercially available fluorophore.

PHOTOTHERAPEUTIC NEAR IR FLUORESCENT LIGHT FILTERS

RELATED APPLICATIONS

This application is a divisional application of U.S. application Ser. No. 14/331,147, filed Jul. 14, 2014, entitled "Phototherapeutic Near IR Fluorescent Ophthalmic Lenses and Light Filters" which claims the benefit under 35 U.S.C. 119(e) of the U.S. provisional application No. 61/957,818 filed on Jul. 12, 2013 and of the U.S. provisional application No. 61/957,826 filed on Jul. 12, 2013.

FIELD OF THE INVENTION

The present invention is directed to ophthalmic lenses and light filters containing fluorescent compounds that absorb light in the UV and visible region of wavelengths and that have fluorescence emission in selected wavelength regions of the red and near infrared—in order to enhance phototherapy for the human eye when it is exposed to sunlight and artificial lighting.

DESCRIPTION OF THE RELATED ART

Prior art has described light filtering agents for sunscreens that filter primarily UV light (U.S. Pat. Nos. 4,889,947; 4,950,467; 8,278,459). A pending application (Dyan and Gallas) was filed 3 March entitled, 'Compound, Composition, and Method for Protecting Skin from High Energy Visible Light' 61/217,207 Filed May 28, 2009, "Compound, Composition, and Method for Protecting Skin from High Energy Visible Light," and describes the use of melanin with enhance absorption of HEV light and enhanced transmission of red light for skin care applications.

A pending application (Gallas and Simmons, Ser. No. 12/807,656) describes the use of melanin as an ideal light filter that optimizes protection, vision and NIR-based therapy as indicated by its transmission spectrum shown in FIG. 1. Specifically, the applicants (Gallas and Simmons, application Ser. No. 12/807,656) proposed to transmit 100% of the light between 700 nm and 1200 nm and, furthermore, to use anti-reflective coatings to increase the transmission over the wavelength range 700 nm to 1200 nm.

In each of the above cases, the light filtering agents proposed reduce the risk of damage due to photochemistry of tissue that is associated with the higher energy photons—400 nm to 500 nm; and they transmit red and near infrared light that is believed to be therapeutic to tissue. And whatever light that is absorbed by the protective light filters is converted into heat through radiationless transitions from the excited states—rather than through fluorescence, for example.

For the purposes of describing this invention it is noted that: a) the terrestrial electromagnetic radiation from the sun (shown in FIG. 1) spans a region of wavelengths that includes the UV, the HEV (high energy visible), visible light and the near IR (near infrared); direct sunlight that reaches the human eye contains solar energy composed of 6.8% ultraviolet light, 38.9% visible light, and 54.3% infrared radiation. b) it is well-known that exposure to the UV region of light increases the risks of damage to the skin and to the lens of the eye; c) more recently, the HEV region of wavelengths have been associated with an increased risk for macular degeneration and also damage to the skin; d) the visible region is what is used by humans to get around; and e) still more recently, the near IR (NIR) part of the electromagnetic spectrum of wavelengths is believed to result in cellular repair or therapy; and finally, f) a molecular mechanism has been proposed for this repair that involves absorption of NIR light by cytochrome-C found in every cell (FIG. 2). The process is seen to energize the cells and initiate a therapeutic response of repair to the tissue; and the action spectrum for cytochrome-C spans the wavelength range continuously from 700 nm to 1200 nm.

BRIEF SUMMARY OF THE INVENTION

The objects of this invention are: to increase the intensity of the red and near IR photons from sunlight that reach the cornea, lens and retina of the human eye—beyond what is directly emitted by sunlight—by the use of appropriate fluorescent compounds.

The objects of this invention are also to specify the wavelength regions for light absorption and emission by the fluorescent compounds that are appropriate for phototherapy for the eye; the objects of this invention are also to identify and incorporate fluorescent compounds having the appropriate absorption and emission spectra; and finally, the objects of this invention are to incorporate the above fluorescent compounds into ophthalmic lenses that preserve the optical qualities for phototherapy of the eye described above.

The additives of this invention will selectively absorb UV, HEV and visible light and convert the excited state energy associated with this absorption into fluorescence. And furthermore, the fluorescence emission should span the wavelength range primarily from 700 nm to 1200 nm—the wavelength region of absorption by cytochrome-C (FIGS. 3 and 4)—but to also include the region from 600 nm to 1200 nm. Phototherapy is thereby enhanced in this invention over all prior art because excited state energy created from the absorption of light over the region between 300 nm and 700 nm, and that would otherwise have been dissipated as heat—as in the case of prior art—is transformed, instead, into NIR light that is absorbed by cytochrome-C. This NIR fluorescence is separate, distinct from, and over and above the NIR component of sunlight that is simply transmitted by the chromophores or fluorophores (as disclosed, for example in the patent applications by Gallas and Dyan cited above)

Definitions

UV. UV light is the electromagnetic radiation having wavelengths that span the region of about 200 nm to 400 nm. Very little sunlight has a components in the region between 200 nm and 300 nm.

HEV. HEV light is the high energy visible region of the electromagnetic spectrum of wavelengths—between 400 nm and 480 nm.

PT Light Filters with NIR Luminescent Materials means Phototherapeutic Light Filters with Near Infrared Luminescent Materials.

Luminescent materials means materials that fluoresce or phosphoresce.

Melanin is the pigment as defined in U.S. Pat. No. 5,112,883

Ocular Lens Pigment is the pigment as defined in U.S. Pat. No. 6,825,975

BRIEF DESCRIPTION OF THE DRAWINGS

FIG. 1—The solar intensity as a function of wavelength. Sunlight that reaches the human skin contains solar energy composed of 6.8% ultraviolet light, 38.9% visible light, and 54.3% infrared radiation.

FIG. 2—Proposed action spectra for cytochrome-C. Absorption spans the red to near IR range of wavelengths.

FIG. 3. Absorption and Emission spectra of a commercially available fluorophore that absorbs light in the visible part of the spectrum and emits in a range if near IR wavelengths that overlap the action spectrum of cytochrome C of FIG. 2.

FIG. 4 Emission spectrum measured from a suspension of single-walled carbon nanotubes in aqueous media using laser excitation at 658 nm. (Figure courtesy of Applied NanoFluorescence, LLC)

FIG. 5. Absorption and Emission spectra of a commercially available fluorophore (Life Technologies) that absorbs light in the visible part of the spectrum and emits in a range if near IR wavelengths that overlap the action spectrum of cytochrome C of FIG. 2.

DETAILED DESCRIPTION OF THE INVENTION

Luminescence is a physical process whereby an electron is excited by a photon with de-excitation occurring almost spontaneously, and whereby emission from a luminescent substance ceases when the exciting source is removed. In fluorescent materials, the excited state has the same spin as the ground state. If denotes an excited state of a substance A, then fluorescence consists of the emission of a photon,

$A^* \rightarrow A + h\nu$,

In phosphorescence, there is a change in electron spin, which results in a longer lifetime of the excited state (second to minutes). It is an essential point of this invention that fluorescence and phosphorescence occur at longer wavelength than the excitation radiation.

More specifically, if a molecule or compound absorbs UV or HEV (high energy visible) light, then emission can occur at longer-wavelength red light. Furthermore, some specific substances are able to fluoresce selectively in the range of wavelengths from 700 nm to 1200 nm. This range of wavelengths—from 700 nm to 1200 nm—is absorbed by cytochrome C and the process is associated with energizing cells and the repair of human tissue.

An essential object of this invention is to increase the intensity of the near Infrared (NIR) light that reaches the cornea, lens and retina of the human eye—beyond what is directly emitted by sunlight—by the use of appropriate fluorescent compounds that are incorporated into ophthalmic lenses and other light filters. In this invention, UV and visible light that would otherwise be absorbed and then converted to heat—as in the case of all previous art relating to sunglass lenses and ophthalmic lenses, in general—is absorbed and then, at least partially converted into near infrared fluorescence.

The objects of this invention are also to: a) specify the wavelength regions for light absorption and emission by the fluorescent compounds that provide as much photo-therapy for the eye—but without otherwise compromising vision, given that fluorescent light is a source of glare; b) identify and incorporate fluorescent compounds having the appropriate absorption and emission spectra according to a); and c) to incorporate the above fluorescent compounds into ophthalmic lenses that preserve the optical qualities for phototherapy of the eye described above.

Preferred Embodiment

A preferred embodiment for the objects of this invention is to identify materials that: a) selectively absorb UV and visible light; b) also have a high transmission of near IR light; c) the materials of a) and b) fluoresce or luminesce primarily over the region of wavelengths 600 nm to 1200 nm that matches—or falls within—the action spectrum for cytochrome C which has been associated with the repair of human cells; and d) to demonstrate that the preceding materials can be incorporated into ophthalmic lens materials. Thus, the excitation spectrum of the fluorophores should span the region 300 nm to 700 nm, and the fluorescence emission spectrum should be similar in shape to the action spectrum or optical absorption spectrum for cytochrome C and span the region of wavelengths between 600 nm and 1200 nm—or if not similar, fall within the region 600 nm to 1200 nm. In this way, sunlight energy with wavelengths between 300 nm and 700 nm that is absorbed by a light filter such as a sunglass lens or a light filter—that would otherwise convert this light into heat—will, instead, be converted into fluorescence. And this emission of near infrared light that will energize the cells of human tissue resulting in repair or therapy of ocular tissue.

Normally, light that enters the eye other than what is associated with what is being imaged is considered glare. Thus, an image of some object of interest and which is produced by reflection of sunlight of this object and which enters the eye and carries an image of the object to the retina will be compromised by extraneous light such as fluorescence—the latter being defined as glare.

Thus, It is an important consideration of this invention that the naturally-occurring benefits of repair that can arise from near IR fluorescence are possible because such fluorescence occurs in a region of wavelengths wherein the eye is not sensitive to such light that would otherwise be considered glare.

Several inherent factors can mitigate the performance of this invention: The Stokes Shift imposes practical limits on the wavelength differences between peak excitation and peak emission wavelengths. Very large Stokes shifts are reported as nominally 200 nm. This means that most fluorophores in light filters that are excited by light having wavelengths of 500 nm or shorter will not likely emit at wavelengths longer than 700 nm. Then if fluorescent materials are chosen with excitation maxima occurring in the HEV region of wavelength, a significant part of their emission maxima will likely occur in the visible part of the spectrum and this light will be perceived as glare because fluorescence is not associated with any image and so competes with the light carrying the image.

More accurately, there will be less materials available with Stokes shifts larger than 200 nm that would allow NIR fluorescence to occur if the excitation wavelengths fall within the UV or HEV region of wavelengths. However, some materials can be identified with very large Stokes shifts and can be used as an object of this invention. Furthermore, even if significant fluorescence occurs in the visible region of wavelength, it may not be perceived as significant glare provided that such fluorescence is limited to the red end of the spectrum (650 nm and longer) where the sensitivity of the eye is very low.

If a 'perception of significant glare' can be quantified, then a minimally acceptable level of fluorescence in the visible region can be set as follows: In the case of sunglass lenses, a haze value of approximately 1% or less is considered acceptable for the consumer by the lens industry. In this case, the haze is the result of scatter off of micron-sized particles by the visible part of the sunlight passing through the lens. Fluorescence can roughly be considered in the same light as haze. Thus a fluorescence intensity of approximately 1% of the light that enters the eye could be set as a maximum value to be tolerated. However, the sensitivity of the eye can also be factored into this maximum value as follows $$Haze_{FI} = \Sigma F_\lambda \times S_\lambda \cdot \Delta\lambda / \Sigma I_\lambda \Delta\lambda$$

$$\Sigma F_\lambda \times S_\lambda \cdot / I$$

Where $F_\lambda$ is the fluorescence intensity at a specific wavelength; $S_\lambda$ is the sensitivity of the eye at that wavelength; at a specific wavelength; $I_\lambda$ is the intensity of the light passing through the light filter at that wavelength; and $\Delta\lambda$ is the wavelength interval.

Thus, the haze due to fluorescence—factoring in the overlap between the sensitivity spectrum of the eye and the fluorescence emission spectrum. For example, the eye has very little sensitivity at 650 nm; and still less at 700 nm; and hardly any beyond 750 nm. Thus the sum in the above equation for the haze should run between 600 nm and 750 nm. Beyond 750 nm, any near IR light that is enhanced by the articles of this invention will not contribute to glare; however, another essential aspect of this invention is that it is possible—and useful—to allow some light between 600 nm and 750 nm to be enhanced by the fluorescent compounds envisioned in this invention to because they may contribute significantly to photo-therapy.

Organic dyes, quantum dots, and single-walled carbon nanotubes (SWNTs), have been employed for in vitro and in vivo biological imaging in the NIR region. SWNTs are a group of one-dimensional (1-D) macromolecular fluorophores, with intrinsic bandgap fluorescence emission between 0.9-1.4 μm upon excitation in the visible or NIR. The large Stokes shift makes SWNTs ideal probes for biological imaging with high contrast and low background. Thus far, SWNTs have been used as in vitro fluorescence tags for cell imaging, ex vivo imaging of tissues and organs, and in vivo imaging of normal organs as well as tumors. An example of the fluorescence of a SWNT is shown in FIG. 4 that could be used to realize the objects of this invention.

Another object of this invention is to create new materials or modify existing materials to increase the overall fluorescence or quantum yield for emission in the region 700 nm to 1200 nm that also have the properties of a) through c) inclusive of the preceding paragraph.

Applicant notes there are several ways to cause such a modification: 1) the materials selected can be chemically of physically modified to increase their Stokes shift so that either shorter excitation wavelengths can be achieved for a given emission maxima, or or so that longer emission wavelengths can be achieved for give excitation wavelengths; 2) the quantum efficiency can be increased using standard methods (for example, increasing/decreasing the rigidity of the host medium, etc.)

The fluorescent molecules or compounds of this invention can also be blended with common ophthalmic lenses in a thermoset lens casting process, or in in injection molding process commonly used to make sunglass lenses. In this way, the UV and HEV components of sunlight (or artificial light) are absorbed by the compound instead of being absorbed by the cornea or retina of the eye.

This objects of this invention can be realized by: A) selection of existing compounds and molecules that have the light-absorption and luminescence properties described above; or, B) by chemical modification of existing molecules to enhance the absorption and fluorescence to better conform to the properties described above.

A particular technical challenge of the present invention is the inherently-small Stokes shift (the difference in wavelength or frequency units between positions of the emission and absorption maxima) that is associated with fluorescence. Among the many existing fluorescent molecules and compounds, 100 nm is considered a large Stokes shift. Furthermore, the UV (300 nm to 400 nm) or HEV (400 nm to 500 nm) are both far removed from the near IR (here, 700 nm to 1200 nm). This means that within the UV and visible range of excitation wavelengths, it will be more common to identify a lens filtration system that involves fluorophores with absorption maxima at wavelength nominally greater than 600 nm. This means that most of the candidates for NIR fluorescence will involve emission wavelengths very close to the red end of the visible spectrum. In the case of ophthalmic lens applications, this presents an unwanted potential for glare because omnidirectional fluorescence of visible light competes with light that is carrying an image to the retina. On the other hand, the eye is much less sensitive to red light.

The literature cites other ways to achieve larger Stokes shifts useful for this invention:

"A readily accessible new class of near infrared (NIR) molecular probes has been synthesized and evaluated. Specific fluorophores in this unique xanthene based regioisomeric seminaphthofluorone dye series exhibit a combination of desirable characteristics including (i) low molecular weight (339 amu), (ii) aqueous solubility, and (ii) dual excitation and emission from their fluorescent neutral and anionic forms. Importantly, systematic changes in the regiochemistry of benzannulation and the ionizable moieties afford (iv) tunable deep-red to NIR emission from anionic species and (v) enhanced Stokes shifts. Anionic SNAFR-6, exhibiting an unusually large Stokes shift of 200 nm (5,014 cm1) in aqueous buffer, embodies an unprecedented flouorophore that emits NIR fluorescence when excited in the blue/green wavelength region. The successful use of SNAFR-6 in cellular imaging studies demonstrates proof-of-concept that this class of dyes possesses photophysical characteristics that allow their use in practical applications. Notably, each of the new fluorophores described is a minimal template structure for evaluation of their basic spectral properties, which may be further functionalized and optimized yielding concomitant improvements in their photophysical properties."

Another NIR fluorescence system can consist of a complex whereby a 'donor molecule' absorbs light in the visible region of wavelength and then transfers its excited energy to an acceptor molecule which fluoresces in the NIR region of wavelength—as in the example below:

"Energy transfer from photoexcited porphyrin molecules to single-walled carbon nanotubes (SWNTs) has been experimentally detected for samples in aqueous Triton X-100 micellar suspensions. Addition of SWNTs to micelle-suspended porphyrin results in strong quenching of porphyrin fluorescence. Measurements of concentration-dependent quenching and spectra suggest that this process arises from formation of ground state non-covalent complexes between porphyrins and SWNTs. Optical excitation of the porphyrin generates characteristic near-IR emission from the SWNTs, indicating efficient energy transfer within the complexes. This energy transfer is deduced to occur through a Dexter-type electron exchange mechanism. Complexation of SWNTs with organic photosensitizers provides a novel way of uniformly exciting a wide range of nanotube structural species in polydisperse samples using only a single excitation wavelength"

Selection and Preparation of the Fluorescent Dyes—Preferred Embodiment.

The preferred embodiment of this invention is a single substance that has all of the desired properties although to some limited degree. Preferably, the fluorophores will:
Will have:
- a) an average transmission of 1% or less of the UV light-weighted by the source emission spectrum;
- b) an average transmission of 5% or less of the HEV light-weighted by the source emission spectrum;
- c) a fluorescence emission selectively in the near IR between 600 nm and 1200 nm
- d) A quantum yield—defined as F=[number of photons emitted (600 nm to 1200 nm)/number of photons absorbed (300 nm to 700 nm)] greater than 0.1
- e) Factoring in of overlap of sunlight spectrum (S1× starting at 750 nm $\Sigma\ \alpha_\lambda S_\lambda / \Sigma S_\lambda$. $\alpha$ is the absorption spectrum of cytochrome C;

So, integrate from I=500 nm to 750 nm gives about 325 w/m2 between 500 nm and 750 nm, or 0.0325 j/sec-cm2.

So after 100 sec—a reasonable therapy period of time—you have 3.25 j/cm2.—which is just inside the typical range of therapy 2-4 j/cm2.

So if all of the energy (or a significant part of it) between 500 nm and 750 nm can be converted into near IR instead of heat, then the idea is feasible.

According to FIG. 3, for the dye 4-SulfonIR, the principal absorption occurs within the wavelength region of 400 nm to 750 nm; and according to FIG. 4, the corresponding terrestrial solar intensity in the same region of wavelengths is (750 nm–400 nm)×(~1.4 W/m2nm)~490 W/m2.

So, about ½ of the sun's energy lies between 400 nm and 750 nm (the other half of the sun's energy is distributed over the wavelength regions 300 nm to 400 nm; and 1200 nm to 2500—with the bulk of the energy between 1200 nm and 2500 nm. If 4-SulfonIR is used as a point of reference, it is possible to approximate the potential of the present invention to create light filters that significantly enhance the throughput of near IR energy by implanting fluorophores into these light filters. Assuming that approximately 75% of the light is absorbed, for example by dyes similar or better than the 4-SulfonIR dye and with a quantum yield of about 75%, then more than 50% of the energy of the visible light could be available as near IR energy for photo-therapy—over and above what might be transmitted in the near IR region, and over and above what might otherwise be absorbed over the region 400 nm to 750 nm and converted into heat instead.

Assuming a combination of dyes could be identified, it is possible to absorb light in the region between 350 nm and emit throughout the region between 700 nm and 1200 nm and reach higher energies, or fractions of the total near IR energy Second Embodiment A second way to achieve the object of this invention is the preparation of a mixture of fluorophores each having an excitation band (absorption maxima) located at a different wavelength within the UV range (UVA, UVB, UVC) and visible light range (400 nm to 700 nm) and with corresponding emission band in the near IR spanning the range from 700 nm to 1200 nm.

Generally, hydrophobic fluorophores can be dispersed in organic solvents along with hydrophobic polymers—such as polymethylmethacrylate—after which the solvent is allowed to evaporate and the fluorophore is encapsulated within the polymer. The composite can then be added to any standard skin care formulation. Likewise, hydrophilic fluorophores can be co-dissolved in water along with hydrophilic polymers—such as polyvinyl alcohol; and, again, the solvent (water in this case) can be allowed to evaporate leaving the flouorophore encapsulated within the polymer Incorporation of the Fluorescent Dyes into Light Filters—Possible Configurations:
1) UV and HEV-absorbing Fluorophores—Placed in front of the light filter or within the light filter
2) UV and HEV-absorbing Phosphores—Placed in front of the light filter or within the light filter The invention introduced here could also serve to underscore the need to make the distinction between damage and repair and to offer more repair options to people.

EXAMPLE 1

A coating comprising a fluorescent dye with near IR emission over a transparent substrate was made as follows: 0.074 g of polymethylmethacrylate was co-dissolved with a solution of N-(3-triethylammoniumpropyl)-4-(6-(4-(diethylamino)phenyl) hexatrienyl)pyridiniumdibromide, obtained from Life Technologies as the fluorescent dye. (1 mg of dye dispersed in 1.3 mL of toluene) to yield a solution of PMMA (0.065%) and dye (77%). 0.25 microliters of this solution was deposited onto a clear acrylic sheet 2 mm thickness. The toluene was allowed to evaporate at room temperature (about 22 degrees C.) to form a solid, thin film approximately 20 mm in diameter. The excitation/emission spectrum of the fluorescent dye is shown in FIG. 5.

EXAMPLE 2

A coating similar to Example 1 was prepared using Quantum Dots (1 mg of non-polar non-functionalized, dodecanethiol coated, heavy metal free CuInS2/ZnS fluorescent nanocrystals, Catalog No. CIS-690-P-1 purchased from AC Diagnostics, and dispersed in 1.3 mL of toluene) to yield a solution as the fluorescent dye. The emission spectrum of this fluorescent dye has a maximum at 690 nm and an excitation band throughout the visible spectrum.

The invention claimed is:
1. A light filter comprising:
   a luminescent dye; and
   a transparent substrate;
   the luminescent dye having a red and near infrared luminescence within the wavelength range wherein tissue repair occurs and the luminescent dye being in a sufficient amount to cause tissue repair and wherein the emission of the luminescent dye is in a region of wavelengths that match the absorption spectrum of cytochrome-C.
2. The light filter according to claim 1 wherein the transparent substrate is a skin lotion.
3. The light filter according to claim 1 wherein the transparent substrate is a cream.
4. The light filter according to claim 1 wherein the luminescent dye is a phosphorescent dye.
5. The light filter according to claim 1 wherein the luminescent dye is a fluorescent dye.
6. The light filter according to claim 1 wherein the transparent substrate is a skin care formulation.

* * * * *